US010827185B2

(12) United States Patent
Aaron et al.

(10) Patent No.: US 10,827,185 B2
(45) Date of Patent: Nov. 3, 2020

(54) TECHNIQUES FOR ROBUSTLY PREDICTING PERCEPTUAL VIDEO QUALITY

(71) Applicant: NETFLIX, Inc., Los Gatos, CA (US)

(72) Inventors: Anne Aaron, Menlo Park, CA (US); Zhi Li, Mountain View, CA (US); Todd Goodall, Austin, TX (US)

(73) Assignee: NETFLIX, INC., Los Gatos, CA (US)

(*) Notice: Subject to any disclaimer, the term of this patent is extended or adjusted under 35 U.S.C. 154(b) by 480 days.

(21) Appl. No.: 15/207,468

(22) Filed: Jul. 11, 2016

(65) Prior Publication Data

US 2017/0295374 A1  Oct. 12, 2017

Related U.S. Application Data

(60) Provisional application No. 62/319,688, filed on Apr. 7, 2016.

(51) Int. Cl.
*H04N 19/156* (2014.01)
*H04N 19/86* (2014.01)
(Continued)

(52) U.S. Cl.
CPC ....... *H04N 19/154* (2014.11); *G06K 9/00718* (2013.01); *H04N 17/004* (2013.01); *H04N 19/00* (2013.01)

(58) Field of Classification Search
CPC .... H04N 17/004; H04N 19/154; H04N 19/86; H04N 1/00307; H04N 2101/00;
(Continued)

(56) References Cited

U.S. PATENT DOCUMENTS

2002/0090134 A1  7/2002  Van Zon
2003/0012426 A1*  1/2003  Ali .................. H04N 17/00
                                                  382/155
(Continued)

FOREIGN PATENT DOCUMENTS

WO   1997039417 A2   10/1997
WO   2002087259 A1   10/2002

OTHER PUBLICATIONS

International Search Report and Written Opinion for Application No. PCT/US2017/025801 dated Jun. 30, 2017, 13, pages.
(Continued)

*Primary Examiner* — Leron Beck
*Assistant Examiner* — Samuel D Fereja
(74) *Attorney, Agent, or Firm* — Artegis Law Group, LLP (57) ABSTRACT

In various embodiments, a quality trainer trains a model that computes a value for a perceptual video quality metric for encoded video content. During a pre-training phase, the quality trainer partitions baseline values for metrics that describe baseline encoded video content into partitions based on genre. The quality trainer then performs cross-validation operations on the partitions to optimize hyperparameters associated with the model. Subsequently, during a training phase, the quality trainer performs training operations on the model that includes the optimized hyperparameters based on the baseline values for the metrics to generate a trained model. The trained model accurately tracks the video quality for the baseline encoded video content. Further, because the cross-validation operations minimize any potential overfitting, the trained model accurately and consistently predicts perceived video quality for non-baseline encoded video content across a wide range of genres.

20 Claims, 5 Drawing Sheets

(51) Int. Cl.
*H04N 19/149* (2014.01)
*H04N 19/154* (2014.01)
*H04N 19/00* (2014.01)
*G06K 9/00* (2006.01)
*H04N 17/00* (2006.01)

(58) Field of Classification Search
CPC ..... H04N 2201/3278; H04N 21/44222; H04N 2201/3225; H04N 5/23219; H04N 1/32101; H04N 21/42201; H04N 21/4532; H04N 21/47; H04N 2201/3274; H04N 19/115; H04N 19/117; H04N 19/59; H04N 1/2133; H04N 2005/91328; H04N 2005/91364; H04N 21/4131; H04N 5/23222; H04N 5/782; H04N 5/913; H04N 17/02; H04N 19/136; H04N 19/139; H04N 19/149; H04N 19/164; H04N 19/176; H04N 19/177; H04N 19/196; H04N 19/33; H04N 19/44; H04N 19/53; H04N 19/61; H04N 19/85; H04N 19/89; H04N 21/23418; H04N 21/23439; H04N 21/44008; H04N 21/64322; H04N 21/812; H04N 5/225; H04N 5/235; H04N 13/275; H04N 17/00; H04N 17/002; H04N 19/00; H04N 19/12; H04N 19/124; H04N 19/126; H04N 19/14; H04N 19/142; H04N 19/146; H04N 19/156; H04N 19/162; H04N 19/17; H04N 19/172; H04N 19/192; H04N 19/31; H04N 19/36; H04N 19/42; H04N 19/46; H04N 19/593; H04N 19/597; H04N 19/60; H04N 19/80; H04N 19/87; H04N 19/895; H04N 1/00127; H04N 1/00244; H04N 1/00328; H04N 1/00331; H04N 1/00336; H04N 1/32144; H04N 1/32203; H04N 2013/0074; H04N 21/00; H04N 21/23406; H04N 21/2402; H04N 21/252; H04N 21/2542; H04N 21/25825; H04N 21/25858; H04N 21/25891; H04N 21/266; H04N 21/2747; H04N 21/4307; H04N 21/4312; H04N 21/4318; H04N 21/44204; H04N 21/44209; H04N 21/44245; H04N 21/458; H04N 21/4621; H04N 21/466; H04N 21/4662; H04N 21/4666; H04N 21/4668; H04N 21/47217; H04N 21/475; H04N 21/4751; H04N 21/4756; H04N 21/47815; H04N 21/4782; H04N 21/4784; H04N 21/4788; H04N 21/482; H04N 21/4826; H04N 21/4886

See application file for complete search history.

(56) References Cited

U.S. PATENT DOCUMENTS

| | | |
|---|---|---|
| 2008/0260042 A1 | 10/2008 | Shah et al. |
| 2013/0027568 A1 | 1/2013 | Zou et al. |
| 2015/0142702 A1* | 5/2015 | Nilsson .................. G06N 5/048 706/11 |
| 2015/0379430 A1* | 12/2015 | Dirac ..................... G06N 20/00 706/12 |
| 2016/0021376 A1 | 1/2016 | Andreopoulos et al. |

OTHER PUBLICATIONS

Engelke et al., "An Artificial Neural Network for Quality Assessment in Wireless Imaging Based on Extraction of Structural Information", 2007 IEEE International Conference on Acoustics, Speech, and Signal Processing, Apr. 15-20, 2007, Honolulu, HI, USA, IEEE, Piscataway, NJ, USA, Apr. 15, 2007, p. I-1249, XP031463095.
"VMAF Project on Github." 2017 [Online]. Available: https://github.com/Netflix/vmaf.
T.-J. Liu, J. Y. Lin, W. Lin, and C.-C. J. Kuo, "Visual Quality Assessment: Recent Developments, Coding Applications and Future Trends," APSIPA Transactions on Signal and Information Processing, 2013.
A. Aaron, Z. Li, M. Manohara, J. Lin, E.-H. Wu, and C.-C. Kuo,"Challenges in Cloud Based Ingest and Encoding for High Quality Streaming Media," in Proc. IEEE International Conference on Image Processing (ICIP), 2015.
S. Li, F. Zhang, L. Ma, and K. Ngan, "Image Quality Assessment by Separately Evaluating Detail Losses and Additive Impairments," Multimedia, IEEE Transactions on, vol. 13, No. 5, pp. 935-949, Oct 2011.
H. Sheikh and A. Bovik, "Image Information and Visual Quality," Image Processing, IEEE Transactions on, vol. 15, No. 2, pp. 430-444, Feb. 2006.
C.-C. Chang and C.-J. Lin, "LIBSVM: A Library for Support Vector Machines," ACM Trans. Intelligent Systems and Technology, vol. 2, No. 3, 2011.
A. Mittal, A. K. Moorthy, and A. C. Bovik, "No-Reference Image Quality Assessment in the Spatial Domain," Image Processing, IEEE Transactions on, vol. 21, No. 12, pp. 4695-4708, Dec. 2012.
https://en.wikipedia.org/wiki/Random forest, Last modified Feb. 27, 2017.
"Daala Video Codec." [Online]. Available: https://wiki.xiph.org/Daala, Last modified on Mar. 15, 2017.
"Are We Compressed Yet?" [Online]. Available: https://arewecompressedyet.com, 2017.
"Scikit-learn: Machine Learning in Python." [Online]. Available: http://scikit-learn.org/stable/—pulled Apr. 2, 2017.
"CVXOPT: Python Software for Convex Optimization." [Online]. Available: http://cvxopt.org/ Last update Nov. 30, 2016.
"TensorFlow." [Online]. Available: https://www.tensorflow.org/—pulled Apr. 2, 2017.

* cited by examiner

TECHNIQUES FOR ROBUSTLY PREDICTING PERCEPTUAL VIDEO QUALITY

CROSS-REFERENCE TO RELATED APPLICATIONS

This application claims the priority benefit of the U.S. Provisional Patent Application having Ser. No. 62/319,688 and filed on Apr. 7, 2016. The subject matter of this related application is hereby incorporated herein by reference.

BACKGROUND OF THE INVENTION

Field of the Invention

Embodiments of the present invention relate generally to computer science and, more specifically, to techniques for robustly predicting perceptual video quality.

Description of the Related Art

Efficiently and accurately encoding source video content is critical for real-time delivery of high-quality video content. After the encoded video content is received, the encoded video content is decoded for viewing or for further operations. Some encoding processes employ lossless compression algorithms, such as Huffman coding, to enable exact replication of the source video content. By contrast, to increase compression rates and/or reduce the size of the encoded video content, other encoding processes leverage "lossy" data compression techniques that eliminate certain selected information during the compression process. With "lossy" techniques, the source video content can only be approximately reconstructed when decoded or uncompressed. Further with "lossy" techniques, distortions may be introduced during resizing operations in which the decoded video content is scaled-up to a larger resolution to match the dimensions of a display device.

Because of the variations in encoded video content quality, it is desirable to implement quality controls to ensure that the visual quality of the decoded video content derived from the encoded video content is acceptable. Manually verifying the visual quality of decoded video content is prohibitively time consuming. Accordingly, automated video content quality assessment is often an integral part of the encoding and streaming infrastructure. For example, automated video quality assessment is often employed in evaluating encoders and fine-tune streaming bitrates to maintain encoded video content quality.

In one approach to automatically assessing the quality of encoded video content, one or more full-reference quality metrics, such as peak signal-to-noise ratio (PSNR), are used to compare the source video content to the encoded video content. However, while such metrics accurately reflect signal fidelity (i.e., the faithfulness of the encoded video content to the source video content), these metrics typically do not reliably predict human perception of the quality of the decoded video content derived from the encoded video content. For example, metrics that reflect signal fidelity typically do not indicate that visual artifacts present in still scenes are more likely to be noticed by viewers than visual artifacts present in fast-motion scenes and are therefore more likely to degrade the overall viewing experience.

Other approaches involve generating perceptive quality metrics based on subjective user ratings of the visual quality of decoded video content derived from encoded video content. However, perceptive quality metrics typically suffer from lack of robustness. For example, if a perceptive quality metric is generated based solely on subjective user ratings of simple cartoons, such a perceptive quality metric is unlikely to accurately predict the visual quality of complex action movies. Accordingly, generating subjective metrics for the wide range of video content available in a typical collection of movie and television shows is impractical, if not impossible.

As the foregoing illustrates, what is needed in the art are more effective techniques for predicting the perceived quality of decoded video content derived from encoded video content.

SUMMARY OF THE INVENTION

One embodiment of the present invention sets forth a computer-implemented method for estimating perceptual video quality. The method includes for each genre included in multiple genres, generating a partition that subdivides metric values associated with baseline encoded video content based on the genre; performing one or more cross-validation operations across the partitions to determine optimized hyperparameters for a model; performing one or more training operations on the model based on the optimized hyperparameters and the metric values to generate a trained model; and applying the trained model to target encoded video content to compute a perceptual video quality metric value.

One advantage of the disclosed techniques for estimating perceptual video quality is that the perceptual video quality metric robustly predicts perceived video quality across a diverse range of video content. In particular, because the techniques optimize hyperparameters associated with the trained model, any potential overfitting associated with the baseline encoded video content is mitigated. Consequently, the trained model accurately computes the perceptual video quality of target encoded video content associated with a wide range of genres, including genres that are not represented in the baseline encoded video content.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

Perceptual Quality Modeling System Overview

Figure 1:
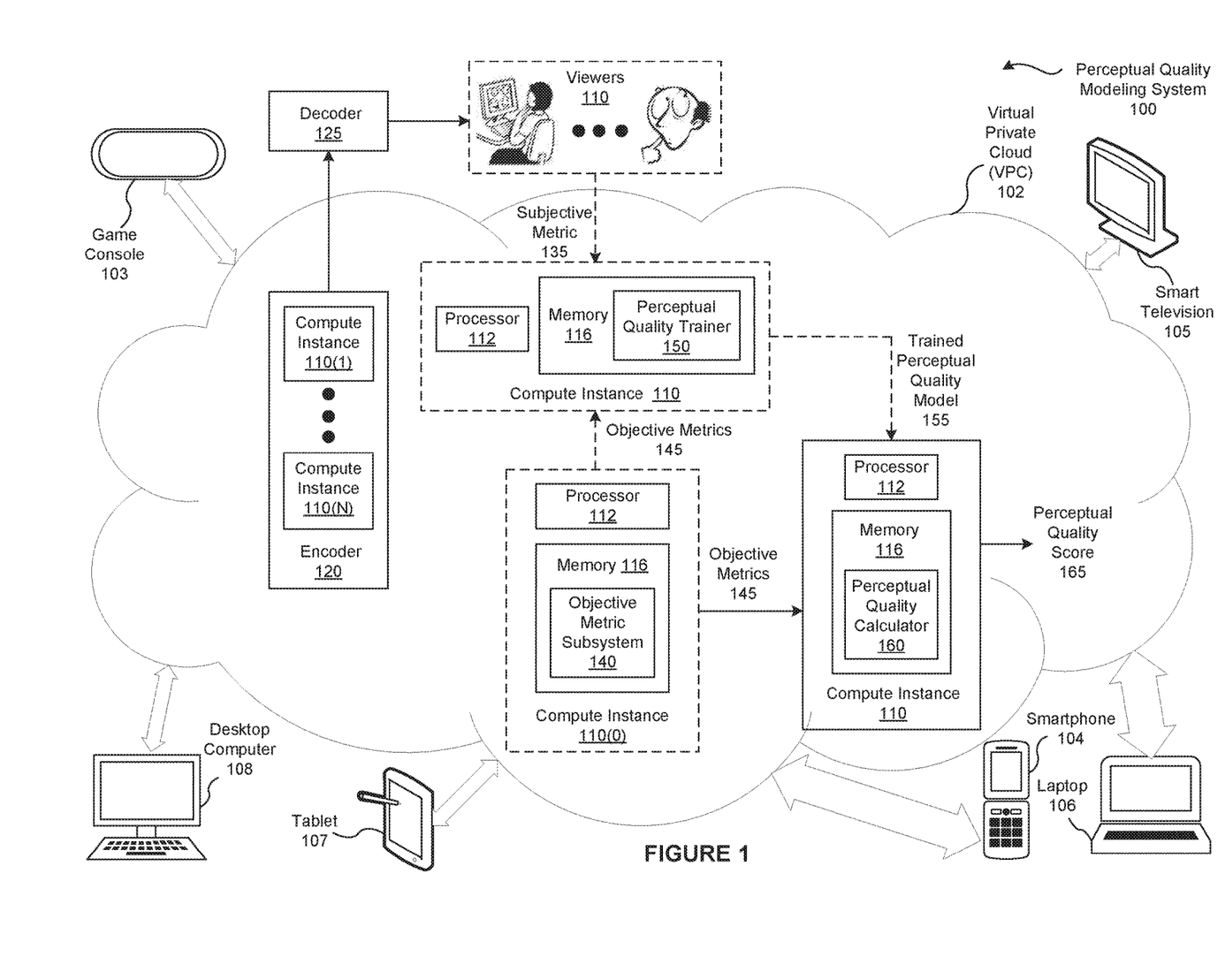
FIG. 1 is a conceptual illustration of a perceptual quality modeling system configured to implement one or more aspects of the present invention.

FIG. 1 is a conceptual illustration of a perceptual quality modeling system 100 configured to implement one or more aspects of the present invention. As shown, the perceptual quality modeling system 100 includes a virtual private cloud (i.e., encapsulated shared resources, software, data, etc.) 102 connected to a variety of devices capable of transmitting input data and/or displaying video content. Such devices include, without limitation, a game console 103, a smartphone 104, a smart television 105, a laptop 106, a tablet 107, and a desktop computer 108. In alternate embodiments, the perceptual quality modeling system 100 may include any number and/or type of input, output, and/or input/output devices in any combination.

The virtual private cloud (VPC) 100 includes, without limitation, any number and type of compute instances 110. The VPC 100 receives input user information from an input device (e.g., the laptop 106), one or more computer instances 110 operate on the user information, and the VPC 100 transmits processed information to the user. The VPC 100 conveys output information to the user via display capabilities of any number of devices, such as a conventional cathode ray tube, liquid crystal display, light-emitting diode, or the like.

In alternate embodiments, the VPC 100 may be replaced with any type of cloud computing environment, such as a public or a hybrid cloud. In other embodiments, the perceptual quality modeling system 100 may include any distributed computer system instead of the VPC 100. In yet other embodiments, the perceptual quality modeling system 100 does not include the VPC 100 and, instead, the perceptual quality modeling system 100 includes a single computing unit that implements multiple processing units (e.g., central processing units and/or graphical processing units in any combination).

For explanatory purposes, multiple instances of like objects are denoted with reference numbers identifying the object and parenthetical numbers identifying the instance where needed. As shown for the compute instance 110(0), each compute instance 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, the compute instances 110 included in the VPC 100 are configured to implement one or more applications. As shown, compute instances 110(1)-110(N) are configured as an encoder 120. The encoder 120 implements any type of data compression techniques as known in the art and in any technically feasible fashion. In some embodiments, the encoder 140 is a parallel chunk encoder that partitions the source data into multiple chunks and then performs data compression techniques concurrently on the chunks.

To comply with resource constraints, such as encoded data size limitations and available streaming bandwidth, the encoder 120 implements lossy data compression techniques that eliminate selected information. By eliminating information, the encoder 120 creates "compression" artifacts that introduce distortions when the source data is reconstructed. The visual quality of the reconstructed source data is often further compromised by other elements included in the transcoding pipeline (i.e., the applications that translate the source data in one format to the reconstructed data in another format). For example, "scaling" artifacts may be introduced during the process of down-scaling and encoding the source data and then up-scaling the decoded data to the source resolution at the display device.

To ensure an acceptable viewing experience, the quality of the reconstructed data and, indirectly, the caliber of the elements included in the transcoding pipeline are typically evaluated at various points in the design and delivery process using quality metrics. The values for the quality metrics are then used to guide the development of applications (e.g., encoders) and the real-time optimization of content delivery, such as stream-switching algorithms that are quality-aware.

Many widely applied quality metrics (e.g., mean-squared-error (MSE) and peak signal-to-noise ratio (PSNR)) measure fidelity—the faithfulness of the reconstructed data to the source data. However, fidelity measurements do not reflect psycho-visual phenomena affecting the human visual system (HVS) such as masking, contrast sensitivity, or the highly structured content in natural images. Further, due to such imperfectly reflected perceptual effects, such fidelity metrics are content-dependent—the values are not comparable across different types of video content. For instance, video content with grain noise is relatively heavily penalized in PSNR although the visual impact detectable by human viewers is relatively low. In general, conventional quality metrics are not a reliable indication of the visual quality as perceived by humans and, therefore, the acceptability of the viewing experience.

For this reason, one or more of the compute instances 110 in the VPC 102 implement machine learning techniques to institute a consistent perceptual quality metric. Notably, a perceptual quality score 165 (i.e., value for the perceptual quality metric) correlates in a universal manner to subjective human visual experience irrespective of the type of video content. Any type of learning algorithm as known in the art may be leveraged to implement the consistent perceptual quality metric. In some embodiments, a random forest provides the framework for the consistent perceptual quality metric. In other embodiments, a support vector machine (SVM) implements the algorithms to establish the consistent perceptual quality metric.

During a learning stage, depicted in FIG. 1 with dotted lines, a perceptual quality trainer 150 creates a trained perceptual quality model 155. The trained perceptual quality model 155 is a supervised learning model that combines objective metrics 145 to optimally track the values for the subjective metric 135 assigned during viewings of baseline data. The objective metric subsystem 140 generates the objective metrics 145 based on comparison operations between the baseline video content and the corresponding baseline encoded video content. Such objective metrics 145 are referred to as full-reference quality indices, and may be generated in any technically feasible fashion. After a decoder 125 generates reconstructed baseline video content from the baseline encoded video content, viewers 110 watch the reconstructed baseline video content on display devices, such as the screen of the laptop 106, and personally rate the visual quality—assigning values to the subjective metric 135. The perceptual quality trainer 150 receives the calculated values for the objective metrics 145 and the human-assigned values for the subjective metric 135. The perceptual quality trainer 150 then trains a perceptual quality model based on these metrics to generate the trained perceptual quality model 155.

As a general matter, as part of training a model, a machine learning algorithm typically optimizes values for parameters associated with the model based on optimizing the performance of the model on the baseline data. However, because of idiosyncrasies in the baseline data, optimizing a model solely based on the performance of the model with respect to the baseline data may result in an "overfit" model. When a model is overfit, the model has relatively poor predictive capability for "non-baseline" data. As referred to herein, non-baseline data is any data that is not included in the baseline data. For example, suppose that the baseline data did not include any animated video content. While an overfit model could produce accurate results for the video content included in the baseline data, the overfit model would not necessarily produce accurate results for animated video content. For this reason, many advanced machine learning algorithms also optimize values for hyperparameters associated with the model to generalize the performance of the model.

Notably, the baseline data included in the perceptual quality training system 100 is limited to encoded video content for which manually-generated values for the subjective metrics 135 exist. To ensure that the perceptual quality calculator 160 produces accurate results across a wider range of video content, the perceptual quality trainer 150 implements a two phase learning stage that optimizes both hyperparameters and parameters. During an initial pre-training phase, the perceptual quality trainer 150 optimizes the hyperparameters included in the perceptual quality model. In particular, the perceptual quality trainer 150 executes cross-correlation operations as well as machine learning algorithms to optimize the accuracy of the perceptual quality model for "non-baseline data."

Subsequently, during a training phase, the perceptual quality trainer 150 optimizes the parameters for the perceptual quality model that already includes the optimized hyperparameters. In operation, the perceptual quality trainer 150 implements learning algorithms that recognize patterns between the objective metrics 145 and the subjective metric 135. More precisely, the perceptual quality trainer 150 fuses values for the objective metrics 145 into a perceptual quality score 165 that reflects the value for the subjective metric 135 and, consequently, the experience of the viewers 110. After completing the training phase of the learning stage, the perceptual quality trainer 150 generates the trained perceptual quality model 155 that includes both the optimized hyperparameters and the optimized parameters. As a result, the trained perceptual quality model 155 accurately predicts the perceptual quality for both baseline data and non-baseline data.

In a scoring stage, depicted in FIG. 1 with solid lines, a perceptual quality calculator 160 receives the perceptual quality model 155 and the values for the objective metrics 145 for target encoded video content. The perceptual quality calculator 160 applies the perceptual quality model 155 to the values for the objective metrics 145 and generates the perceptual quality score 165 for the target encoded video content. The values for the objective metrics 145 may be generated in any technically feasible fashion. For example, the objective metric subsystem 140 may compare any reference data (e.g., source data) to any derived target data (e.g., encoded source data) to calculate the values for the objective metrics 145.

Computing Perceptual Quality Scores

Figure 2:
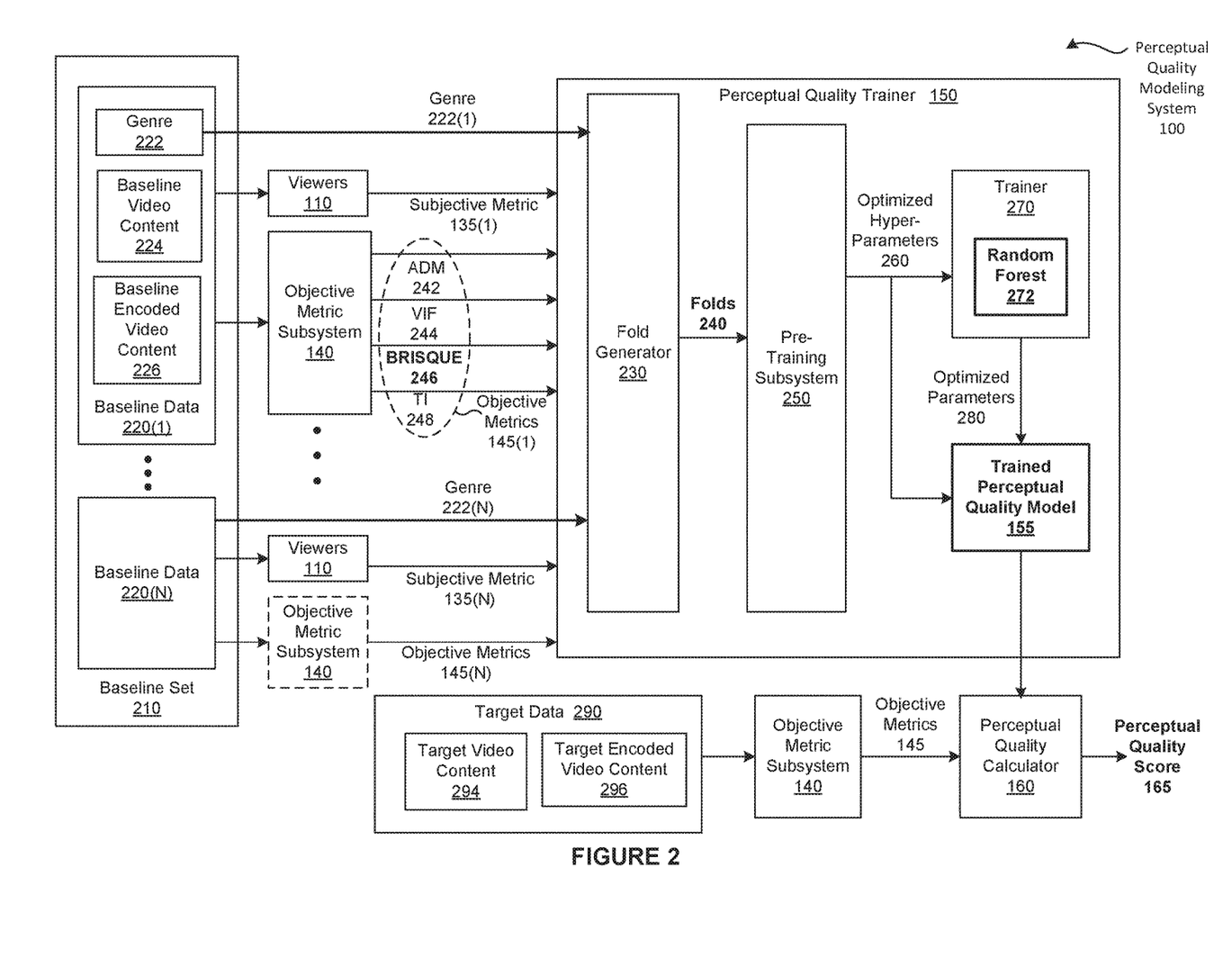
FIG. 2 is a more detailed block diagram of the perceptual quality modeling system of FIG. 1, according various embodiments of the present invention.

FIG. 2 is a more detailed block diagram of the perceptual quality modeling system 150 of FIG. 1, according various embodiments of the present invention. As shown, a baseline set 210 includes any number of baseline data 220. Each baseline data 220 includes, without limitation, a genre 222, a baseline video content 224, and any number of baseline encoded video content 226.

As referred to herein, the genre 222 may be any type of category based on any number and combination of characteristics of the baseline data 220, the baseline video content 224, and/or the baseline encoded video content 226. For example, and without limitation, in some embodiments, one or more of the genres 222 may specify a content characteristic of the associated baseline video content 224, such as action, drama, and so forth. In other embodiments, one or more of the genres 222 may specify a source characteristic of the associated baseline video content 224, such as heavy-file grain noise, camera noise, etc. Further, one or more of the genres 222 may specify a corner-case characteristic of the associated baseline video content 224, such as a relatively high percentage of black frames with low ambient noise. In general, each of the baseline data 220 may be associated with a particular genre 222 in any technically feasible fashion and as part of a manual process, an automated process, or any combination thereof.

The baseline video content 224 included in the baseline set 210 may include any number and length of video clips that represent the range of the genres 222 that are included in the baseline set 210. In some embodiments the baseline set 210 includes the MCL-V video database of video clips that is available publically from the University of Southern California. In other embodiments, the ML-V video database of video clips is supplemented with selected high film grain clips and animation titles to increase the diversity and the robustness of the baseline set 210. In general, the baseline encoded video content 226 included in the baseline set 210 are derived from the baseline video content 224 included in the baseline set 210. More specifically, for each of the baseline data 220, the encoder 150 is configured to encode the baseline video content 224 repeatedly, at a variety of different resolutions and/or quality levels (i.e., bitrates) to generate the baseline encoded video content 226. In this fashion, a predetermined number of the baseline encoded video content 226 are generated from each of the baseline video content 224 included in the baseline set 210.

Upon receiving the baseline video content 224 and the baseline encoded video content 226 for the baseline set 210, the objective metric generation subsystem 140 computes the values for the objective metrics 145. In general, each conventional objective metric exhibits both strengths and weaknesses. For example, a visual information fidelity (VIF) 224 is relatively good at detecting slight blurring artifacts, but is relatively poor at detecting blocking artifacts. To leverage the strengths and mitigate the weaknesses, the objective metric generation subsystem 140 is configured to calculate a set of the objective metrics 145 that, together, provide valuable insight into the visual quality across the range of the baseline encoded video content 226. The selection of the objective metrics 145 may be made in any technically feasible fashion to address any number of anticipated artifacts. For instance, in some embodiments, the objective metrics 145 are empirically selected to assess degradation caused by compression (i.e., blockiness) and scaling (i.e., blurriness).

As shown, the objective metrics 145 include an additive impairment measure (ADM) 242, the visual information fidelity (VIF) 244, a blind/referenceless image spatial quality evaluator (BRISQUE) 246, and a temporal information (TI) 248. Each of these metrics may be associated with any number of values, also known as "features." As part of generating the objective metrics 145, the objective metric generation subsystem 140 may include any number of features for each metric in the objective metrics 145 and discard the remainder. For example, in some embodiments, the objective metrics 145 include one ADM 242 feature, four VIF 224 features, twelve BRISQUE features 246, and one TI 248 feature. In such embodiments, the values of the objective metrics 145 for a particular baseline encoded video content 226 specify values for a total of 18 features.

The values for the subjective metric 135 are assigned by the viewers 110 after watching the baseline video content 224 and decoded versions of the baseline encoded video content 226, referred to herein as reconstructed baseline video content, on any number and type of display devices. In one embodiment, each of the viewers 110 watch each of the baseline video content 224 side-by-side with each of the reconstructed baseline video content and assigns values to the subjective metric 135. The value for the subjective metric 135 is an absolute value that indicates the perceived visual quality. For instance, in one embodiment, the value for the subjective metric 135 may vary from 0 through 100. A score of 100 indicates that the reconstructed baseline video content appears identical to the baseline video content 224. A score below 20 indicates that the visual quality of the reconstructed baseline video content appears appreciably different than the baseline video content 224. For example, a score below 20 could indicate that the reconstructed baseline video content loses significant scene structure and exhibits considerable blurring relative to the baseline video content 224.

In some embodiments, to ensure that the values for the subjective metrics 135 reflect a typical viewing experience, the viewers 110 include a variety of "typical" people without any particular expertise in video content processing. Further, in some embodiments, to ensure that the values for the subjective metrics 135 reflect a wide range of viewing conditions, the display devices on which the viewers 110 watch the baseline video content 224 and the reconstructed baseline video content may be varied. For example, the display devices may include, without limitation, the game console 103, the smartphone 104, the smart television 105, the laptop 106, the tablet 107, and the desktop computer 108.

As shown, the perceptual quality trainer 150 includes, without limitation, a fold generator 230, a pre-training subsystem 250, a trainer 270, and the trained perceptual quality model 155. In general, the fold generator 230 and the pre-training subsystem 250 implement machine learning algorithms in conjunction with cross-validation techniques to generate optimized hyperparameters 260 that minimize the "generalization error" of the trained perceptual quality model 155. As referred to herein, the generalization error is a measure of how accurately the trained perceptual quality model 155 is able to predict the perceptual quality scores 165 for baseline encoded video content 226 and/or genres 222 that are not included in the baseline set 210.

In operation, the fold generator 230 partitions the values for the subjective metrics 135 and the values for the objective metrics 145 associated with the baseline set 210 into multiple folds 240 based on the genres 222. Each of the folds 240 is also referred to herein as a "partition." More specifically, for each of the genres 222 included in the baseline set 210, the fold generator 230 generates a separate fold 240. Although not shown in FIG. 2, each of the folds 240 includes, without limitation, a testing genre, fold testing metric values, and fold training metric values. For a particular fold 240, the fold generator 230 sets the testing genre equal to the genre 222, and divides the values for the subjective metrics 135 and the values for the objective metrics 145 that are associated with the baseline set 210 into fold testing metric values and fold training metric values.

In general, as referred to herein, values for metrics are also referred to herein as metric values. Accordingly, the values for the objective metrics 145 are also referred to herein as objective metric values. Similarly, the values for the subjective metrics 134 are also referred to herein as subjective metric values. Further, the values for metrics that are associated with baseline data 220 that include a given genre 222 are also referred to herein as metric values that are associated with the given genre 222.

If the genre 222 associated with a particular baseline data 220 is equal to the testing genre, then the fold generator 230 adds the values for the objective metrics 145 that are associated with the baseline data 220 to the fold testing metric values. In alternate embodiments, the fold generator 230 may also add the values for the subjective metrics 135 that are associated with the baseline data 220 to the fold testing metric values. If, however, the genre 222 associated with a particular baseline data 220 is not equal to the testing genre, then the fold generator 230 adds the values for the subjective metrics 135 and the values for the objective metrics 145 that are associated with the baseline data 220 to the fold training metrics.

In this fashion, the fold generator 230 includes the values for the objective metrics 145 associated with each of the baseline data 220 in the fold testing metric values of one of the folds 240. In a complementary fashion, the fold generator 230 include the values for the subjective metrics 135 and the objective metrics associated with each of the baseline data 220 in the fold training metric values of all but one of the folds 240. Accordingly, the values for the objective metrics 145 included in the union of the fold testing metric values across all the folds 240 are commensurate with the values for the objective metrics 145 associated with the baseline data 220 included in the baseline set 210. For example, if the baseline set 210 includes two hundred baseline data 220, then the union of the fold testing metric values across all the folds 240 includes the values for the objective metrics 145 associated with the two hundred baseline data 220.

After the fold generator 230 generates the folds 240, the pre-training subsystem 250 selects a "hyperparameter combination," and performs cross-validation operations based on the selected hyperparameter combination. As referred to herein, a hyperparameter combination is a set of values for the hyperparameters included in the perceptual quality model. Further, values for hyperparameters are also referred to herein as hyperparameter values. For each of the folds 240, the pre-training subsystem 250 trains the perceptual quality model that includes the selected hyperparameter combination based on the fold training metric values. The result of the training is a fold-specific set of values for the parameters included in the perceptual quality model, referred to herein as "fold-specific parameter values."

The pre-training subsystem 250 then computes perceptual quality scores 165 for each of the fold testing metrics based on the perceptual quality model that includes the selected hyperparameter combination and the fold-specific parameter values. Although the pre-training subsystem 250 trains and tests each of the folds 240 individually, the union of the perceptual quality scores 165 across the folds 240 includes a perceptual quality score 165 for each of the baseline encoded video content 226 included in the baseline set 210. The pre-training subsystem 250 then performs correlation operations on the perceptual quality scores 165 and the values for the subjective metrics 135 to determine a hyperparameter correlation for the selected hyperparameter combination. The perceptual quality scores 165 are also referred to herein as values for a perceptual visual quality metric and/or perceptual visual quality metric values.

The pre-training subsystem 250 selects a new hyperparameter combination and repeats the cross-validation operations described above to generate a hyperparameter correlation for the new hyperparameter combination. The pre-training subsystem 250 continues to generate hyperparameter correlations for different hyperparameter combinations in this manner until the pre-training subsystem 250 has finished evaluating all permutations of the hyperparameters. In alternate embodiments, instead of exhaustively evaluating all permutations of the hyperparameters, the pre-training subsystem 250 may be configured to generate and evaluate any number of different hyperparameter combinations in any technically feasible fashion. In some embodiments, the pre-training subsystem 250 may generate and evaluate any number of different hyperparameter combinations substantially in parallel. The pre-training subsystem 250 then sets the optimized hyperparameters 260 based on the hyperparameter combination that is associated with the optimal hyperparameter correlation.

After receiving the optimized hyperparameters 260, the trainer 270 performs training operations based on the values for the subjective metrics 135 and the values for the objective metrics 145 associated with the entire baseline set 210 to generate the optimized parameters 280. As shown, the trainer 270 includes, without limitation, a random forest 272. As persons skilled in the art will recognize, the random forest 272 is a machine learning algorithm based on decision trees that performs better than many other machine learning algorithms when the amount of data available for training is relatively small. As a general matter, the number of available video content is far greater than the number of baseline encoded video content 226 with values for the subjective metric 135. Consequently, the performance of the random forest 272 exceeds the performance of many machine learning algorithms for the baseline set 210 and the folds 240. In alternate embodiments, any number and type of machine learning algorithms as known in the art may be selected instead of the random forest 272 based on any criterion. For example, in some embodiments, the random forest 272 may be replaced with a support vector machine (SVM).

The trainer 270 applies machine learning techniques based on the random forest 272 to the perceptual quality model that includes the optimized hyperparameters 280 to generate optimized parameters 280. More precisely, the trainer 270 trains the random forest 272 that implements the optimized hyperparameters 280 to identify correlations between the observed values for the subjective metric 135 and the calculated values for the objective metrics 145. Notably, the trainer 270 performs training operations based on all the baseline encoded video content 226 included in the baseline set 210. The trainer 270 then generates the trained perceptual quality model 155—a fusion of the objective metrics 135 that estimates the subjective metric 135. Because the trained perceptual quality model 155 includes both the optimized parameters 280 and the optimized hyperparameters 260, the performance of the trained perceptual quality model 155 is optimized for the baseline video content 224 and generalized for other video content.

The perceptual quality calculator 150 operates during the scoring stage—computing the perceptual quality score 165 based on target data 290 and the "trained" perceptual quality model 155. As shown, the target data 290 includes, without limitation, a target video content 294 and an target encoded video content 296. The target encoded video content 296 is derived from the target video content 294. Upon receiving the target video content 294 and the target encoded video content 296, the objective metric generation subsystem 140 computes the values for the objective metrics 145. In general, the values for the objective metrics 145 may be determined in any technically feasible fashion. For instance, some embodiments include multiple objective metric calculators, and each objective metric calculator computes a different objective metric. Subsequently, the perceptual quality calculator 150 applies the perceptual quality model 155 to the values for the objective metrics 145 to generate the perceptual quality score 165. Because the perceptual quality model 155 tracks quality observed by the viewers 110, the perceptual quality score 165 reflects the quality of the target encoded video content 296 when decoded and viewed by humans.

Note that the techniques described herein are illustrative rather than restrictive, and may be altered without departing from the broader spirit and scope of the invention. For example, in alternate embodiments, each of the baseline encoded video content 226 associated with a given baseline video content 224 may be associated with a different genre 222. In such embodiments, many modifications and variations on the functionality provided by the fold generator 230 and/or the pre-training subsystem 250 will be apparent to those of ordinary skill in the art without departing from the scope and spirit of the described embodiments. In another example, in some alternate embodiments, the objective metric subsystem 140 implements one or more no-reference algorithms to generate values for one or more of the objective metrics 145. Because no-reference algorithms do not operate on original source video content, in such embodiments, the baseline data 220 may not include the baseline video content 224 and/or the target data 220 may not include the target video content 294. Further, the values for the subjective metrics 135 may be determined in any technically feasible fashion.

In general, the perceptual quality trainer 150 may be replaced with any number of modules that implement any number of machine learning processes to generate a model that fuses multiple objectively calculated values to track an experimentally observed visual quality. In particular, the fold generator 230 and/or the pre-training subsystem 250 may be replaced with any module that implements any number of machine learning processes to generate the optimized hyperparameters 260. Further, the trainer 270 may be replaced with any module that implements any number of machine learning processes to generate the optimized parameters 280. Correspondingly, the perceptual quality calculator 160 may be replaced with any module that applies the trained perceptual quality model 155 in a consistent fashion.

The granularity (e.g., per frame, per scene, per shot, per 6 minute clip, etc.) of the training data 105, the objective metrics 145 and the subjective metrics 135 may vary within and between implementations. As persons skilled in the art will recognize, conventional mathematical techniques (e.g., averaging, extrapolating, interpolating, maximizing, etc.) may be applied to the objective metrics 145 and the subjective metrics 135 in any combination to ensure measurement unit consistency. Further, the perceptual quality trainer 150 and the perceptual quality calculator 160 may be configured to determine the trained perceptual quality model 155 and/or the perceptual quality score 165 at any granularity.

Figure 3:
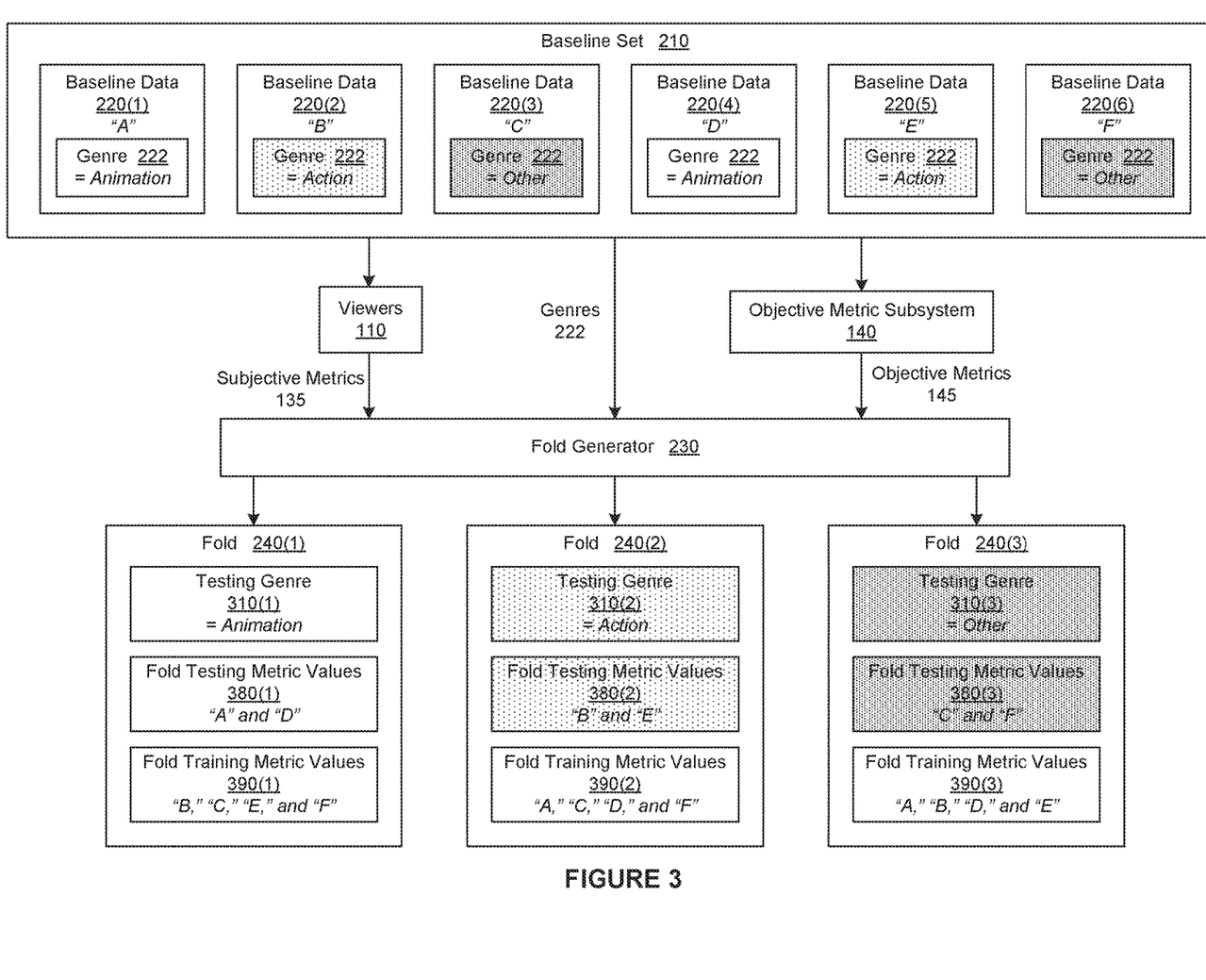
FIG. 3 is an exemplary illustration of the operations performed by the fold generator of FIG. 2, according various embodiments of the present invention.

FIG. 3 is an exemplary illustration of the operations performed by the fold generator 230 of FIG. 2, according various embodiments of the present invention. As shown, the baseline set 210 includes six baseline data 220 that are associated with three different genres 222. For explanatory purposes only, each of the baseline data 220 is labeled with a letter that identifies the baseline video content 224 and the corresponding baseline encoded video content 226. In alternate embodiments, the baseline set 210 may include any amount of the baseline data 220, and the baseline data 220 may include any number and type of information. In various embodiments, the number and definition of the genres 222 may vary.

The baseline data 220(1) associated with the baseline video content 224 "A" and the baseline data 220(4) associated with the baseline video content 224 "D" both specify the genre 222 "animation." The baseline data 220(2) associated with the baseline video content 224 "B" and the baseline data 220(5) associated with the baseline video content 224 "E" both specify the genre 222 "action." The baseline data 220(3) associated with the baseline video content 224 "C" and the baseline data 220(6) associated with the baseline video content 224 "F" both specify the genre 222 "other." In alternate embodiments, the baseline set 210 may include any amount of the baseline video content 220, and the baseline video content 220 may include any number and type of information. In various embodiments, the number and definition of different genres 222 may vary.

For each of the baseline data 220, the fold generator 230 receives the genre 222, the values for the subjective metrics 135 based on input from the viewers 110, and the values for the objective metrics 145 generated by the objective metric subsystem 140. The fold generator 230 then generates three folds 240(1), 240(2), and 240(3). Each of the folds 240 includes, without limitation, a testing genre 310, one or more fold testing metric values 380, and one or more fold training metric values 390. For each different genre 222, the fold generator 230 produces a corresponding fold 240 that specifies the genre 222 as the testing genre 310. For each fold 240, the fold generator 230 then partitions the values for the subjective metrics 135 and the values for the objective metrics 145 associated with the baseline data 220 included in the baseline set 210 based on the testing genre 310. More precisely, for each fold 240, the fold generator 230 includes the values for the objective metrics 145 associated with the baseline data 220 that are associated with the testing genre 310 in the fold testing metric values 380. In alternate embodiments, the fold generator 230 also include the values for the subjective metrics 135 that are associated with the baseline data 220 and are associated with the testing genre 310 in the fold testing metric values 380. By contrast, for each fold 240, the fold generator 230 includes the values for the subjective metrics 135 and the values for the objective metrics 145 that are associated with the baseline data 220 and are not associated with the testing genre 310 in the fold training metric values 390.

As shown, for the genre 222 "animation," the fold generator 230 creates the fold 230(1) that includes the testing genre 310(1) "animation." For each of the baseline training video data 220, if the genre 222 matches the testing genre 310(1) "animation," then the fold generator 230 includes the values for the objective metrics 145 in the fold testing metric values 380(1). If, however, the genre 222 does not match the testing genre 310(1) "animation," then the fold generator 230 includes the values for the subjective metrics 135 and the values for the objective metrics 145 in the fold training metric values 390(1). Accordingly, the fold testing metric values 380(1) include the values for the objective metrics 145 that are associated with the baseline data 220(1) and 220(4) and, respectively, the baseline video content 224 "A" and "D." The fold training metric values 390(1) include the values for the subjective metrics 135 and the values for the objective metrics 145 that are associated with the remaining baseline training video data 220(2), 220(3), 220(5), and 220(6) and, respectively, the baseline video content 224 "B," "C," "E," "F."

As also shown, for the genre 222 "action," the fold generator 230 creates the fold 230(2) that includes the testing genre 310(2) "action." The fold testing metric values 380(2) include the values for the objective metrics 145 that are associated with the baseline data 220(2) and 220(5) and, respectively, the baseline video content 224 "B" and "E." The fold training metric values 390(2) include the values for the subjective metrics 135 and the values for the objective metrics 145 that are associated with the remaining baseline data 220(1), 220(3), 220(4), and 220(6) and, respectively, the baseline video content 224 "A," "C," "D," and "F." Finally, for the genre 222 "other," the fold generator 230 creates the fold 230(3) that includes the testing genre 310(3) "other." The fold testing metrics values 380(3) include the values for the objective metrics 145 that are associated with the baseline data 220(3) and 220(6) and, respectively, the baseline video content 224 "C" and "F." The fold training metric values 390(3) include the values for the subjective metrics 135 and the values for the objective metrics 145 that are associated with the remaining baseline data 220(1), 220(2), 220(4), and 220(5) and, respectively, the baseline video content 224 "A," "B," "D," and "E."

Figure 4:
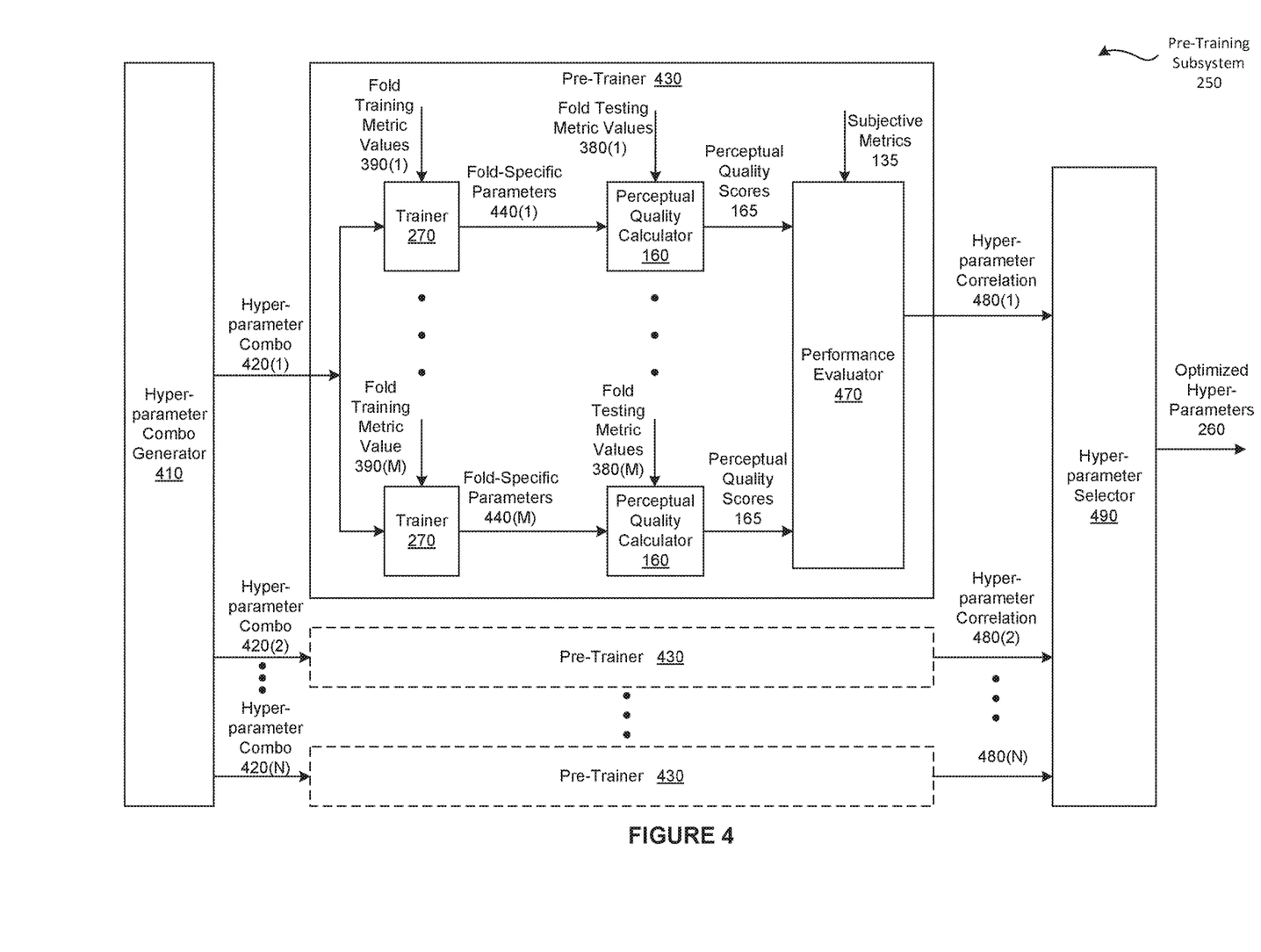
FIG. 4 is a more detailed block diagram of the pre-training subsystem of FIG. 2, according to various embodiments of the present invention.

FIG. 4 is a more detailed block diagram of the pre-training subsystem 250 of FIG. 2, according to various embodiments of the present invention. As shown, the pre-training subsystem 250 includes, without limitation, a hyperparameter combination (combo) generator 410, a pre-trainer 430, and a hyperparameter selector 490. As persons skilled in the art will recognize, the number of hyperparameters varies based on the machine learning technique. Accordingly, the pre-training subsystem 250 is configured to tune the hyperparameters that are associated with the perceptual quality model based on the machine learning techniques implemented in the trainer 270.

The hyperparameter combination generator 410 exhaustively generates hyperparameter combinations (combos) 420 that represent all permutations of values for the set of hyperparameters associated with the perceptual quality model. In alternate embodiments, the hyperparameter combination generator 410 may generate any number of hyperparameter combinations 420 in any technically feasible fashion. Subsequently, for each of the hyperparameter combinations 420, the pre-trainer 430 generates a hyperparameter correlation 480. The pre-trainer 430 may process each of the hyperparameter combinations 420 sequentially, concurrently, or in any combination thereof. For explanatory purposes only, multiple instances of the pre-trainer 430 are depicted operating on different hyperparameter combinations 420(1) through 420(N).

As shown the pre-trainer 430 includes, without limitation, the trainer 270, the perceptual quality calculator 160, and a performance evaluator 470. Upon receiving a particular hyperparameter combination 420, the pre-trainer 430 trains and tests the perceptual quality model that includes the hyperparameter combination 420 individually for each of the folds 240. As a general matter, the pre-trainer 430 may process each of the folds 240 sequentially, concurrently, or in any combination thereof with respect to the other folds 240. For explanatory purposes only, multiple instances of the trainer 270 and the perceptual quality calculator 160 are depicted operating on the folds 240(1) through 240(M).

Referring back to FIG. 2, another instance of the trainer 270 is included in the perceptual quality trainer 150 and generates the optimized parameters 280 based on the values for the subjective metrics 135 and the values for the objective metrics 145 associated with all the baseline encoded video content 226 included in the baseline set 210. Further, another instance of the perceptual quality calculator 160 generates the perceptual quality score 165 for the target encoded video content 294. In alternate embodiments, the pre-trainer 430 may implement any machine learning techniques and any scoring techniques in any technically feasible fashion that is consistent with the trained perceptual quality model 155. For example, the pre-trainer 430 may implement the random forest 272 as part of a trainer that differs from the trainer 270 included in the perceptual quality trainer 150 that generates the optimized parameters 280.

For each of the folds 240(x), the trainer 270 first trains the perceptual quality model that includes the hyperparameter combination 420 based on the fold training metric values 390(x). The result of this training is fold-specific parameters 440(x) that are associated with both the hyperparameter combination 420 and the fold 240(x). After the trainer 270 generates the fold-specific parameters 440(x), the perceptual quality trainer 150 computes the perceptual quality scores 165 based on the values for the objective metrics 145 included in the fold testing metric values 380(x). To compute the perceptual quality scores 165 the perceptual quality trainer 150 applies the perceptual quality model that includes both the hyperparameter combination 420 and the fold-specific parameters 440(x) to the values for the objective metrics 145.

Subsequently, the performance evaluator 470 receives the perceptual quality scores 165 for all the folds 240 and the values for the subjective metrics 135 for all the baseline encoded video content 226 included in the baseline set 210. As described previously herein, the values for the objective metrics 145 included in the union of the fold testing metric values 380 across all the folds 240 are commensurate with the values of the objective metrics 145 that are associated with the baseline encoded video content 226 included in the baseline set 210. Accordingly, the performance evaluator 470 receives the associated perceptual quality scores 165 for each of the baseline encoded video content 226 included in the baseline set 210. The performance evaluator 470 performs correlation operations between the perceptual quality scores 165 and the values of the subjective metrics 135 to compute the hyperparameter correlation 480.

In general, the hyperparameter correlation 480 is a measure of the accuracy of the perceptual quality model that includes the hyperparameter combination 420. The hyperparameter correlation 480 may represent the accuracy of the perceptual quality model in any technically feasible fashion and include any number of values. Further, the performance evaluator 470 may compute the hyperparameter correlation 480 using any techniques as known in the art. For example, in some embodiments, the performance evaluator may apply correlation techniques to compute any number of a root mean squared error, a Pearson correlation coefficient, and a Spearman's rank order correlation coefficient.

After the pre-trainer 230 computes the hyperparameter correlations 480 for all the hyperparameter combinations 420, the hyperparameter selector 490 determines the optimized hyperparameters 260. In general, the hyperparameter selector 490 performs comparison operations between the hyperparameter correlations 480 to identify the hyperparameter combination 420 that minimizes correlation errors. The hyperparameter selector 490 then sets the optimized hyperparameters 260 equal to the identified hyperparameter combination 420. As persons skilled in the art will recognize, because the baseline set 210 is partitioned into the folds 240, the perceptual quality scores 165 generated during the pre-training phase reflect the performance of the perceptual quality model for untrained data. Consequently, by minimizing correlation errors, the hyperparameter selector 490 determines the optimized hyperparameters 260 that minimize the generalization error of the perceptual quality model.

Figure 5:
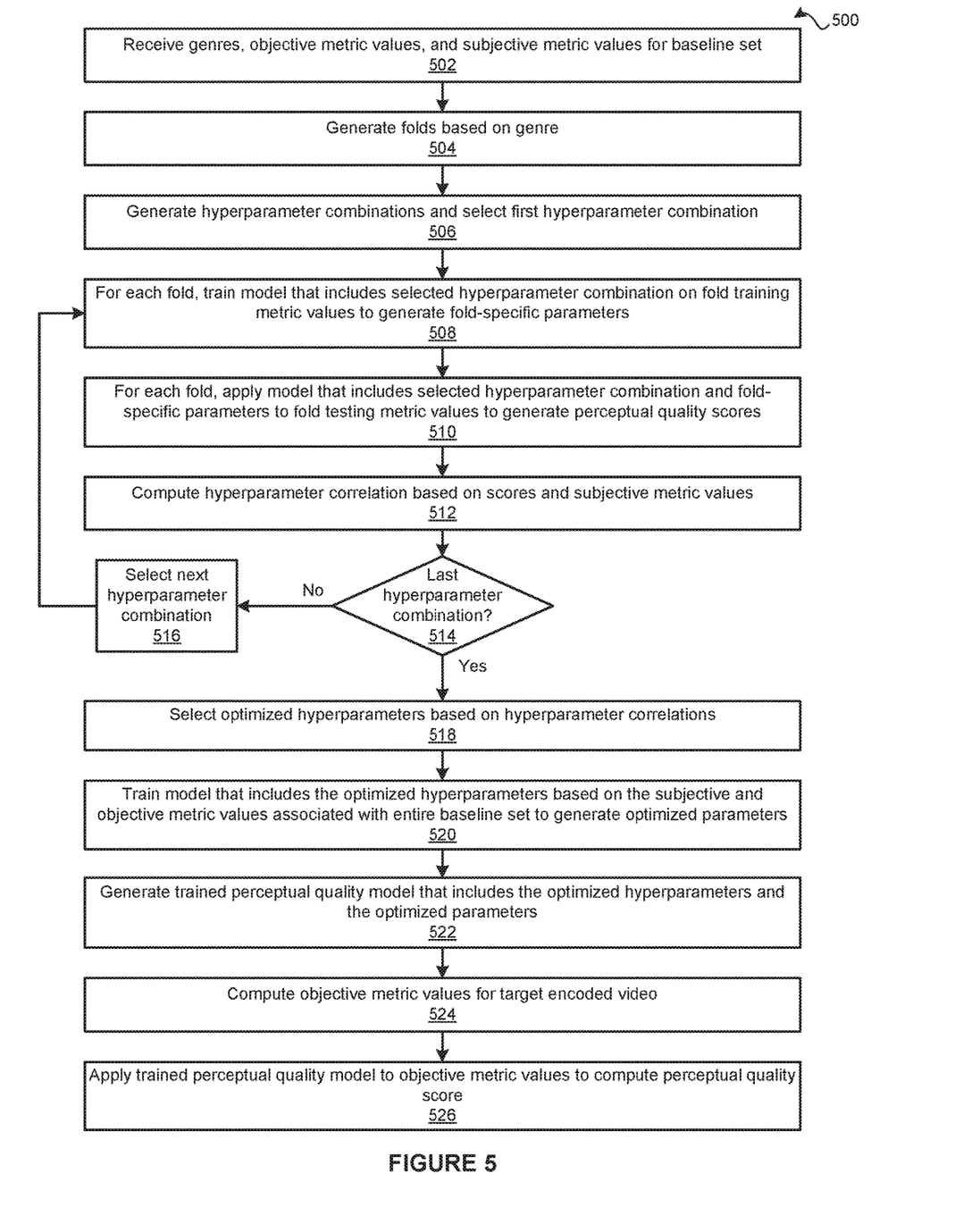
FIG. 5 is a flow diagram of method steps for predicting perceptual visual quality of encoded video content, according to various embodiments of the present invention.

FIG. 5 is a flow diagram of method steps for predicting perceptual visual quality of encoded video content, according to various embodiments of the present invention. Although the method steps are described with reference to the systems of FIGS. 1-4, persons skilled in the art will understand that any system configured to implement the method steps, in any order, falls within the scope of the present invention. The context of FIG. 5 is that the objective metric subsystem 140 generates the values for the objective metrics 145 for the baseline encoded video content 226 included in the baseline set 210. In a complementary fashion, the viewers 110 generate the values for the subjective metrics 135 for the baseline encoded video content 226 included in the baseline set 210.

As shown, a method 500 begins at step 502, where the perceptual quality trainer 150 receives the baseline set 210, the values for the objective metrics 145 for the baseline encoded video content 226, and the values for the subjective metrics 135 for the baseline encoded video content 226. At step 504, the fold generator 230 partitions the values for the subjective metrics 135 and the values for the objective metrics 145 based on the genre 222. More specifically, for each different genre 222 that is included in the baseline set 210, the fold generator 230 produces the fold 240 that includes the genre 222 as the testing genre 310. As described previously herein, for each of the folds 240, the fold training metric values 390 include the portion of the values for the subjective metrics 135 and the objective metrics 145 that are not associated with the testing genre 310. In a complementary fashion, the fold testing metric values 380 include the remaining values for the objective metrics 145.

At step 506, the hyperparameter combination generator 410 generates the hyperparameter combinations 420 that are permutations of the hyperparameters associated with the perceptual quality model. The pre-trainer 430 then selects the first hyperparameter combination 420. At step 508, for each of the folds 240, the trainer 270 trains the perceptual quality model that includes the selected hyperparameter combination 420 based on the fold training metrics values 390. For each of the folds 240, the result of the training are the fold-specific parameters 440 associated with both the fold 240 and the selected hyperparameter combination 420.

At step 510, for each of the folds 240, the perceptual quality calculator 160 applies the perceptual quality model that includes the selected hyperparameter combination 420 and the fold-specific parameters 440 to the fold testing metric values 380 to generate the perceptual quality scores 165. More precisely, the perceptual quality calculator 160 computes the perceptual quality scores 165 based on the values for the objective metrics 145 included in the fold testing metric values 380.

At step 512, the performance evaluator 470 computes the hyperparameter correlation 480 for the selected hyperparameter combination 420 across the folds 240. The performance evaluator 470 computes the hyperparameter correlation 480 based on the perceptual quality scores 165 and the values for the subjective metrics 135 for all the baseline encoded video content 226 included in the baseline set 210. At step 514, the pre-trainer 430 determines whether the selected hyperparameter combination 420 is the last hyperparameter combination 420.

If, at step 514, the pre-trainer 430 determines that the selected hyperparameter combination 420 is not the last hyperparameter combination 420, then the method 500 proceeds to step 516. At step 516, the pre-trainer 430 selects the next hyperparameter combination 420, and the method 500 returns to step 508. The pre-trainer 430 continues to cycle through steps 508-516, computing the hyperparameter correlation 480 for the selected hyperparameter combination 420, until the pre-trainer 430 has finished computing the hyperparameters correlation 480 for all the hyperparameter combinations 420.

If, however, at step 514, the pre-trainer 430 determines that the selected hyperparameter combination 420 is the last hyperparameter combination 420, then the method 500 proceeds directly to step 518. At step 518, the hyperparameter selector 490 selects the optimized hyperparameters 260 based on the hyperparameter correlations 480. In general, the hyperparameter selector 480 sets the optimized hyperparameters 260 equal to the hyperparameter combination 420 that is associated with the optimal hyperparameter correlation 480. As referred to herein, the optimal hyperparameter correlation 480 is the hyperparameter correlation 480 that indicates a closest correlation between the perceptual quality scores 165 and the subjective metrics 135.

At step 520, the trainer 270 trains the perceptual quality model that includes the optimized hyperparameters 260 based on all the baseline encoded video content 226 included in the baseline set 210. The result of the training is the optimized parameters 280. At step 522, the perceptual quality trainer 150 generates the trained perceptual quality model 155 that includes the optimized hyperparameters 260 and the optimized parameters 280. At step 524, the objective metric subsystem 140 generates the values for the objective metrics 145 for the target encoded video content 294. At step 526, the perceptual quality calculator 160 applies the trained perceptual quality model 155 to the values for the objective metrics 145 for the target encoded video content 296 to generate the perceptual quality score 165 for the target encoded video content 296.

In sum, the disclosed techniques may be used to efficiently and reliably predict perceptual video quality across a diverse range of video content. In general, a perceptual quality trainer implements a random forest to fuse values for a set of objective metrics into a perceptual quality score based on human video-viewing feedback. Subsequently, a perceptual quality calculator applies the perceptual quality model to values for the objective metrics for target encoded video content to generate corresponding values for the perceptual quality metric (i.e., visual quality score).

More specifically, the perceptual quality trainer includes a fold generator, a pre-trainer, and a trainer. For each genre that is included in a baseline set of videos, the fold generator produces a fold that designates the subjective metric values and the objective metric values that are not associated with the genre as fold training metrics and the remaining objective metric values as fold testing metrics. The pre-trainer then performs training and scoring operations on the individual folds and correlation operations across the folds based on the subjective metric values for the entire baseline set of videos to optimize hyperparameters associated with the random forest. After optimizing the hyperparameters, the trainer performs training operations on the metric values associated with the entire baseline set of videos to optimize parameters associated with the random forest. Finally, the perceptual quality trainer generates a perceptual quality model that includes the optimized hyperparameters and the optimized parameters.

Advantageously, training the perceptual quality model using direct observations made by human visual systems enables the perceptual quality calculator to efficiently calculate quality scores that reliably predict perceived video content quality in an absolute manner. By contrast, conventional quality metrics typically measure pixel-based signal fidelity—a content-dependent, inconsistent, and unreliable indication of real world viewing appreciation. Further, by performing fold-based pre-training to optimize the hyperparameters, the perceptual quality trainer mitigates any potential overfitting. Consequently, the perceptual quality model may accurately determine the visual quality scores of video content associated with a wide range of genres, including genres that are not represented in the baseline set of video content.

1. In some embodiments, a method comprises for each genre included in a plurality of genres, generating a partition that subdivides a plurality of metric values associated with baseline encoded video content based on the genre; performing one or more cross-validation operations across the partitions to determine optimized hyperparameters for a model; performing one or more training operations on the model based on the optimized hyperparameters and the plurality of metric values to generate a trained model; and applying the trained model to target encoded video content to compute a perceptual video quality metric value.

2. The method of clause 1, wherein performing the one or more training operations on the model comprises applying a random forest algorithm to one or more objective metric values included in the plurality of metric values.

3. The method of clauses 1 or 2, wherein the plurality of metric values includes values for at least one of Blind/Referenceless Image Spatial Quality Evaluator, temporal information, and visual information fidelity.

4. The method of any of clauses 1-3, wherein the plurality of genres includes at least one of an animation genre, an action genre, and a heavy-noise genre.

5. The method of any of clauses 1-4, wherein the plurality of metric values includes at least one human-observed score of visual quality for reconstructed video content that is derived from the baseline encoded video content.

6. The method of any of clauses 1-5, wherein for a given genre, generating the partition comprises determining that a first genre included in the plurality of genres and associated with a first metric value included in the plurality of metric values is equal to the given genre; adding the first metric value to testing metric values included in the partition; determining that a second genre included in the plurality of genres and associated with a second metric value included in the plurality of metric values is not equal to the given genre; and adding the second metric value to training metric values included in the partition.

7. The method of any of clauses 1-6, wherein performing one or more cross-validation operations comprises selecting first hyperparameters for the model; computing a first correlation based on the first hyperparameters and the partitions; determining that the first correlation is closer than a second correlation associated with second hyperparameters for the model; and setting the optimized hyperparameters equal to the first hyperparameters.

8. The method of any of clauses 1-7, wherein computing the first correlation comprises for each partition, pre-training the model based on the first hyperparameters and one or more training metric values included in the partition to generate a partition-specific model; for each partition, applying the partition-specific model to one or more testing metric values included in the partition to compute predicted perceptual video quality scores; and performing one or more correlation operations between the predicted perceptual visual quality scores and one or more subjective metric values included in the plurality of metric values.

9. In some embodiments, a computer-implemented computer-readable storage medium includes instructions that, when executed by a processor, cause the processor to perform the steps of for each genre included in a plurality of genres, generating a partition that subdivides baseline data that describes baseline encoded video content based on the genre; generating a plurality of hyperparameter combinations for a model; performing one or more cross-validation operations across the partitions to select optimized hyperparameters from the plurality of hyperparameter combinations; performing one or more training operations on the model based on the optimized hyperparameters and the baseline data to generate a trained model; and applying the trained model to target encoded video content to compute a perceptual video quality metric value.

10. The computer-readable storage medium of clause 9, wherein the baseline data includes values for at least one of Blind/Referenceless Image Spatial Quality Evaluator, temporal information, and visual information fidelity.

11. The computer-readable storage medium of clauses 9 or 10, wherein the baseline data includes at least one human-observed score of visual quality for reconstructed video content that is derived from the baseline encoded video content.

12. The computer-readable storage medium of any of clauses 8-11, wherein for a first genre, generating the partition comprises determining that a second genre included in the plurality of genres and associated with a first data included in the baseline data is equal to the first genre; adding the first data to testing metric values included in the partition; determining that a third genre included in the plurality of genres and associated with a second data included in the baseline data is not equal to the first genre; and adding the second data to training data included in the partition.

13. The computer-readable storage medium of any of clauses 8-12, wherein performing one or more cross-validation operations comprises selecting a first hyperparameter combination included in the plurality of hyperparameter combinations; computing a first correlation based on the first hyperparameter combination and the partitions; determining that the first correlation is closer than a second correlation associated with a second hyperparameter combination included in the plurality of hyperparameter combinations; and setting the optimized hyperparameters equal to the first hyperparameter combination.

14. The computer-readable storage medium of any of clauses 8-13, wherein the first correlation comprises at least one of a root mean squared error, a Pearson correlation coefficient, and a Spearman's rank order correlation coefficient.

15. The computer-readable storage medium of any of clauses 8-14, wherein performing one or more cross-validation operations comprises for each partition, pre-training the model based on a first hyperparameter combination included in the plurality of hyperparameter combinations and one or more training metric values included in the partition to generate a partition-specific model; for each partition, applying the partition-specific model to one or more testing metric values included in the partition to compute predicted perceptual video quality scores; and performing one or more correlation operations between the predicted perceptual visual quality scores and one or more subjective metric values included in the baseline data.

16. The computer-readable storage medium of any of clauses 8-15, wherein pre-training the model comprises applying a random forest algorithm that implements the first hyperparameter combination to one or more objective metric values included in the one or more training metric values.

17. In some embodiments, a system comprises a memory storing instructions associated with a perceptual visual quality modeling engine; and a processor that is coupled to the memory and, when executing the instructions, for each genre included in a plurality of genres, generate a partition that subdivides a plurality of metric values associated with baseline encoded video content based on the genre; for each partition, perform one or more pre-training operations to compute predicted perceptual quality scores; determine optimized hyperparameters for a model based on the predicted perceptual quality scores associated with the partitions; perform one or more training operations on the model based on the optimized hyperparameters and the plurality of metric values to generate a trained model; and apply the trained model to target encoded video content to compute an output perceptual quality score.

18. The system of clause 17, wherein the plurality of metric values includes at least one human-observed score of visual quality for reconstructed video content that is derived from the baseline encoded video content.

19. The system of clauses 17 or 18, wherein the plurality of genres includes at least one of an animation genre, an action genre, and a heavy-noise genre.

20. The system of any of clauses 17-19, wherein the target encoded video data includes at least one of compressed data and scaled data.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
for each genre included in a plurality of genres, generating a partition corresponding to the genre, wherein the partition includes a subset of a plurality of metric values associated with baseline encoded video content included in the genre;
for each partition, generating partition-specific training metric values corresponding to the partition based on at least one subset of the plurality of metric values associated with baseline encoded video content included in a given genre different from the genre associated with the partition,
for each partition, computing a plurality of predicted quality scores based on a plurality of models, wherein each model of the plurality of models is trained on partition-specific training metric values corresponding to the partition;
determining optimized hyperparameters for a model based on one or more correlations between the pluralities of predicted quality scores computed for the partitions and the subsets of the plurality of metric values corresponding to the partitions;
performing one or more training operations on the model based on the optimized hyperparameters and the plurality of metric values to generate a trained model; and
applying the trained model to target encoded video content to compute a perceptual video quality metric value.

2. The computer-implemented method of claim 1, wherein performing the one or more training operations on the model comprises applying a random forest algorithm to one or more objective metric values included in the plurality of metric values.

3. The computer-implemented method of claim 1, wherein the plurality of metric values includes values for at least one of Blind/Referenceless Image Spatial Quality Evaluator, temporal information, and visual information fidelity.

4. The computer-implemented method of claim 1, wherein the plurality of genres includes at least one of an animation genre, an action genre, and a heavy-noise genre.

5. The computer-implemented method of claim 1, wherein the plurality of metric values includes at least one human-observed score of visual quality for reconstructed video content that is derived from the baseline encoded video content.

6. The computer-implemented method of claim 1, wherein for a given genre, generating the partition comprises:

determining that a first genre included in the plurality of genres and associated with a first metric value included in the plurality of metric values is equal to the given genre;

adding the first metric value to testing metric values included in the partition;

determining that a second genre included in the plurality of genres and associated with a second metric value included in the plurality of metric values is not equal to the given genre; and adding the second metric value to training metric values included in the partition.

7. The computer-implemented method of claim 1, wherein performing one or more cross-validation operations comprises:

selecting first hyperparameters for the model;

computing a first correlation based on the first hyperparameters and the partitions;

determining that the first correlation is closer than a second correlation associated with second hyperparameters for the model; and setting the optimized hyperparameters equal to the first hyperparameters.

8. The computer-implemented method of claim 7, wherein computing the first correlation comprises:

for each partition, pre-training the model based on the first hyperparameters and one or more training metric values included in the partition to generate a partition-specific model;

for each partition, applying the partition-specific model to one or more testing metric values included in the partition to compute predicted perceptual video quality scores; and performing one or more correlation operations between the predicted perceptual visual quality scores and one or more subjective metric values included in the plurality of metric values.

9. One or more non-transitory computer-readable storage media including instructions that, when executed by one or more processors, cause the one or more processors to perform the steps of:

for each genre included in a plurality of genres, generating a partition corresponding to the genre, wherein the partition includes a subset of a plurality of metric values associated with baseline encoded video content included in the genre;

for each partition, generating partition-specific training metric values corresponding to the partition based on at least one subset of the plurality of metric values associated with baseline encoded video content included in a given genre different from the genre associated with the partition, for each partition, computing a plurality of predicted quality scores based on a plurality of models, wherein each model of the plurality of models is trained on partition-specific training metric values corresponding to the partition;

selecting optimized hyperparameters for the model from the plurality of hyperparameter combinations based on one or more correlations between the pluralities of predicted quality scores computed for the partitions and the subsets of the plurality of metric values corresponding to the partitions;

performing one or more training operations on the model based on the optimized hyperparameters and the baseline data to generate a trained model; and applying the trained model to target encoded video content to compute a perceptual video quality metric value.

10. The one or more non-transitory computer-readable storage media of claim 9, wherein the baseline data includes values for at least one of Blind/Referenceless Image Spatial Quality Evaluator, temporal information, and visual information fidelity.

11. The one or more non-transitory computer-readable storage media of claim 9, wherein the baseline data includes at least one human-observed score of visual quality for reconstructed video content that is derived from the baseline encoded video content.

12. The one or more non-transitory computer-readable storage media of claim 9, wherein for a first genre, generating the partition comprises:

determining that a second genre included in the plurality of genres and associated with a first data included in the baseline data is equal to the first genre;

adding the first data to testing metric values included in the partition;

determining that a third genre included in the plurality of genres and associated with a second data included in the baseline data is not equal to the first genre; and adding the second data to training data included in the partition.

13. The one or more non-transitory computer-readable storage media of claim 9, wherein performing one or more cross-validation operations comprises:

selecting a first hyperparameter combination included in the plurality of hyperparameter combinations;

computing a first correlation based on the first hyperparameter combination and the partitions;

determining that the first correlation is closer than a second correlation associated with a second hyperparameter combination included in the plurality of hyperparameter combinations; and setting the optimized hyperparameters equal to the first hyperparameter combination.

14. The one or more non-transitory computer-readable storage media of claim 13, wherein the first correlation comprises at least one of a root mean squared error, a Pearson correlation coefficient, and a Spearman's rank order correlation coefficient.

15. The one or more non-transitory computer-readable storage media of claim 9, wherein performing one or more cross-validation operations comprises:

for each partition, pre-training the model based on a first hyperparameter combination included in the plurality of hyperparameter combinations and one or more training metric values included in the partition to generate a partition-specific model;

for each partition, applying the partition-specific model to one or more testing metric values included in the partition to compute predicted perceptual video quality scores; and performing one or more correlation operations between the predicted perceptual visual quality scores and one or more subjective metric values included in the baseline data.

16. The one or more non-transitory computer-readable storage media of claim 15, wherein pre-training the model comprises applying a random forest algorithm that implements the first hyperparameter combination to one or more objective metric values included in the one or more training metric values.

17. A system comprising:
a memory storing instructions associated with a perceptual visual quality modeling engine; and
a processor that is coupled to the memory and, when executing the instructions, is configured to:
- for each genre included in a plurality of genres, generate a partition corresponding to the genre, wherein the partition includes a subset of a plurality of metric values associated with baseline encoded video content included in the genre;
- for each partition, generate partition-specific training metric values corresponding to the partition based on at least one subset of the plurality of metric values associated with baseline encoded video content included in a given genre different from the genre associated with the partition,
- for each partition, compute a plurality of predicted quality scores based on a plurality of models, wherein each model of the plurality of models is trained on partition-specific training metric values corresponding to the partition;
- determining optimized hyperparameters for a model based on one or more correlations between the pluralities of predicted quality scores computed for the partitions and the subsets of the plurality of metric values corresponding to the partitions;
- perform one or more training operations on the model based on the optimized hyperparameters and the plurality of metric values to generate a trained model; and
- apply the trained model to target encoded video content to compute an output perceptual quality score.

18. The system of claim 17, wherein the plurality of metric values includes at least one human-observed score of visual quality for reconstructed video content that is derived from the baseline encoded video content.

19. The system of claim 17, wherein the plurality of genres includes at least one of an animation genre, an action genre, and a heavy-noise genre.

20. The system of claim 17, wherein the target encoded video data includes at least one of compressed data and scaled data.

* * * * *